(12) United States Patent
Owens

(10) Patent No.: US 7,765,573 B1
(45) Date of Patent: Jul. 27, 2010

(54) IP-BASED SCHEDULING AND CONTROL OF DIGITAL VIDEO CONTENT DELIVERY

(75) Inventor: Steven B. Owens, Kansas City, MO (US)

(73) Assignee: Embarq Holdings Company, LLP, Overland Park, KS (US)

( * ) Notice: Subject to any disclaimer, the term of this patent is extended or adjusted under 35 U.S.C. 154(b) by 978 days.

(21) Appl. No.: 11/074,861

(22) Filed: Mar. 8, 2005

(51) Int. Cl.
*H04N 7/173* (2006.01)

(52) U.S. Cl. .............................. 725/86; 725/90; 725/91; 725/92; 725/103; 725/114; 725/115; 725/138; 725/144; 725/145

(58) Field of Classification Search .................. 725/86, 725/91–92, 103, 114–115, 138, 144–145
See application file for complete search history.

(56) References Cited

U.S. PATENT DOCUMENTS

| | | | |
|---|---|---|---|
| 3,703,714 A | 11/1972 | Andrews | |
| 3,997,718 A | 12/1976 | Ricketts et al. | |
| 4,303,937 A | 12/1981 | Cook | |
| 4,375,637 A | 3/1983 | Desjardins | |
| 4,866,515 A | 9/1989 | Tagawa et al. | |
| 4,872,195 A | 10/1989 | Leonard | |
| 4,959,713 A | 9/1990 | Morotomi et al. | |
| 4,992,866 A | 2/1991 | Morgan | |
| 5,027,211 A | 6/1991 | Robertson | |
| 5,061,916 A | 10/1991 | French et al. | |
| 5,086,385 A | 2/1992 | Launey | |
| 5,109,222 A | 4/1992 | Welty | |
| 5,172,413 A * | 12/1992 | Bradley et al. | ............... 725/121 |
| 5,187,735 A | 2/1993 | Garcia et al. | |

(Continued)

FOREIGN PATENT DOCUMENTS

EP      1 445 917      8/2004

(Continued)

OTHER PUBLICATIONS

Sprint, *Sprint TekNet IP Install Manual*, Oct. 2001.

(Continued)

*Primary Examiner*—Christopher Kelley
*Assistant Examiner*—Mulugeta Mengesha
(74) *Attorney, Agent, or Firm*—Sonnenschein Nath & Rosenthal LLP (57) ABSTRACT

An audiovisual system is provided for a facility having a facility distribution system with a plurality of channels receivable throughout the facility. A plurality of digital media storage devices store digital content files and each reproduce a respective digital content file as respective analog output signals. Each of the respective analog output signals is coupled to respective channels of the facility distribution system. A main server system is coupled to a LAN and provides a directory of subscribed content items in a content library accessible over a WAN. The main server system maintains respective listings of downloaded content items corresponding to each of the digital media storage devices, wherein the main server system is accessible to a user for initiating reproduction of a selected subscribed content item at a selected time. The main server system initiates transfer of the selected subscribed content item from the content library if not listed in a respective listing of downloaded content items for one of the digital media storage devices which is available at the selected time.

20 Claims, 8 Drawing Sheets

U.S. PATENT DOCUMENTS

| | | | |
|---|---|---|---|
| 5,310,349 | A | 5/1994 | Daniels et al. |
| 5,479,267 | A | 12/1995 | Hashimoto |
| 5,550,863 | A | 8/1996 | Yurt et al. |
| 5,565,908 | A | 10/1996 | Ahmad |
| 5,585,838 | A * | 12/1996 | Lawler et al. ............... 725/54 |
| 5,601,432 | A | 2/1997 | Bergman |
| 5,621,456 | A | 4/1997 | Florin et al. |
| 5,684,952 | A | 11/1997 | Stein |
| 5,790,176 | A | 8/1998 | Craig |
| 5,790,935 | A * | 8/1998 | Payton ..................... 725/91 |
| 5,940,594 | A * | 8/1999 | Ali et al. .................. 709/203 |
| 6,020,881 | A | 2/2000 | Naughton et al. |
| 6,038,425 | A | 3/2000 | Jeffrey |
| 6,049,823 | A * | 4/2000 | Hwang ..................... 725/82 |
| 6,060,994 | A | 5/2000 | Chen |
| 6,072,395 | A | 6/2000 | Vega |
| 6,149,441 | A * | 11/2000 | Pellegrino et al. .......... 434/350 |
| 6,182,128 | B1 * | 1/2001 | Kelkar et al. ............... 725/87 |
| 6,185,773 | B1 | 2/2001 | Goedde |
| 6,192,282 | B1 | 2/2001 | Smith et al. |
| 6,233,428 | B1 | 5/2001 | Fryer |
| 6,240,410 | B1 * | 5/2001 | Wical ........................ 1/1 |
| 6,370,323 | B1 | 4/2002 | Adolph et al. |
| 6,374,079 | B1 | 4/2002 | Hsu |
| 6,438,596 | B1 * | 8/2002 | Ueno et al. ................. 709/226 |
| 6,501,502 | B1 | 12/2002 | Chen |
| 6,507,726 | B1 * | 1/2003 | Atkinson et al. ............ 434/350 |
| 6,561,812 | B1 * | 5/2003 | Burmester et al. .......... 434/365 |
| 6,661,340 | B1 | 12/2003 | Saylor et al. |
| 6,748,597 | B1 | 6/2004 | Frisco et al. |
| 6,769,127 | B1 * | 7/2004 | Bonomi et al. .............. 725/39 |
| 6,775,518 | B2 | 8/2004 | Norcott et al. |
| 6,813,777 | B1 | 11/2004 | Weinberger et al. |
| 6,844,807 | B2 | 1/2005 | Inoue et al. |
| 6,879,243 | B1 | 4/2005 | Booth et al. |
| 6,925,499 | B1 * | 8/2005 | Chen et al. .................. 709/226 |
| 6,970,183 | B1 | 11/2005 | Monroe |
| 6,975,346 | B2 | 12/2005 | Kumhyr |
| 7,028,096 | B1 * | 4/2006 | Lee ........................... 709/231 |
| 7,035,390 | B2 | 4/2006 | Elliott |
| 7,046,689 | B2 * | 5/2006 | Burns et al. ................ 370/429 |
| 7,123,142 | B2 | 10/2006 | Bohbot et al. |
| 7,159,233 | B2 * | 1/2007 | Son et al. ................... 725/86 |
| 7,185,282 | B1 * | 2/2007 | Naidoo et al. ............... 715/718 |
| 7,246,369 | B1 * | 7/2007 | Duan et al. .................. 725/115 |
| 2002/0033760 | A1 | 3/2002 | Kobayashi |
| 2002/0038461 | A1 | 3/2002 | White et al. |
| 2002/0048224 | A1 | 4/2002 | Dygert et al. |
| 2002/0049977 | A1 * | 4/2002 | Miller et al. ................ 725/82 |
| 2002/0112121 | A1 | 8/2002 | Gerszberg et al. |
| 2002/0124258 | A1 * | 9/2002 | Fritsch ....................... 725/88 |
| 2002/0138842 | A1 | 9/2002 | Chong et al. |
| 2002/0164155 | A1 * | 11/2002 | Mate .......................... 386/96 |
| 2002/0166123 | A1 | 11/2002 | Schrader et al. |
| 2002/0170064 | A1 | 11/2002 | Monroe et al. |
| 2002/0180579 | A1 | 12/2002 | Nagaoka et al. |
| 2003/0009668 | A1 | 1/2003 | Chan et al. |
| 2003/0046369 | A1 * | 3/2003 | Sim et al. ................... 709/220 |
| 2003/0050935 | A1 * | 3/2003 | Spetsmann ............... 707/104.1 |
| 2003/0051239 | A1 * | 3/2003 | Hudspeth ................... 725/34 |
| 2003/0105854 | A1 | 6/2003 | Thorsteinsson et al. |
| 2003/0121050 | A1 * | 6/2003 | Kalva et al. ................. 725/97 |
| 2003/0123450 | A1 | 7/2003 | Wright et al. |
| 2003/0182420 | A1 * | 9/2003 | Jones et al. ................. 709/224 |
| 2003/0191802 | A1 | 10/2003 | Zhao et al. |
| 2003/0200009 | A1 | 10/2003 | Von Kannewurff et al. |
| 2003/0204856 | A1 * | 10/2003 | Buxton ....................... 725/120 |
| 2003/0208762 | A1 * | 11/2003 | Hanai et al. ................. 725/58 |
| 2004/0003051 | A1 | 1/2004 | Kryzanowski et al. |
| 2004/0015993 | A1 * | 1/2004 | Yacenda et al. ............. 725/87 |
| 2004/9993051 | | 1/2004 | Krzyzanowski et al. |
| 2004/0039757 | A1 | 2/2004 | McClure |
| 2004/0049789 | A1 * | 3/2004 | Bower et al. ................. 725/75 |
| 2004/0117638 | A1 | 6/2004 | Monroe |
| 2004/0117647 | A1 | 6/2004 | Ballard |
| 2004/0148632 | A1 | 7/2004 | Park et al. |
| 2004/0172658 | A1 | 9/2004 | Rakib et al. |
| 2004/0194148 | A1 | 9/2004 | Schultz et al. |
| 2004/0210944 | A1 | 10/2004 | Brassil et al. |
| 2004/0253945 | A1 | 12/2004 | Janik |
| 2004/0268410 | A1 * | 12/2004 | Barton et al. ............... 725/119 |
| 2005/0003338 | A1 * | 1/2005 | Norcott et al. .............. 434/350 |
| 2005/0028208 | A1 | 2/2005 | Ellis et al. |
| 2005/0044166 | A1 * | 2/2005 | Colville et al. .............. 709/215 |
| 2005/0078934 | A1 | 4/2005 | Fish et al. |
| 2005/0080818 | A1 * | 4/2005 | Kindberg et al. ......... 707/104.1 |
| 2005/0125083 | A1 | 6/2005 | Kiko |
| 2005/0131957 | A1 | 6/2005 | Watkinson |
| 2005/0177853 | A1 * | 8/2005 | Williams et al. ............. 725/81 |
| 2005/0193098 | A1 | 9/2005 | Khandpur et al. |
| 2005/0206513 | A1 | 9/2005 | Fallon |
| 2005/0215244 | A1 | 9/2005 | Whitson |
| 2005/0254440 | A1 * | 11/2005 | Sorrell ...................... 370/264 |
| 2005/0278773 | A1 * | 12/2005 | DeCinque et al. ........... 725/138 |
| 2006/0005224 | A1 * | 1/2006 | Dunning et al. .............. 725/115 |
| 2006/0020993 | A1 | 1/2006 | Hannum et al. |
| 2006/0069736 | A1 * | 3/2006 | Czeisler et al. .............. 709/207 |
| 2006/0085824 | A1 * | 4/2006 | Bruck et al. .................. 725/86 |
| 2006/0088806 | A1 * | 4/2006 | Quinn ........................ 434/236 |
| 2007/0006276 | A1 * | 1/2007 | Ashley et al. ............... 725/134 |
| 2007/0050828 | A1 * | 3/2007 | Renzi et al. .................. 725/93 |
| 2007/0130590 | A1 * | 6/2007 | Nash-Putnam .............. 725/63 |
| 2008/0016545 | A1 * | 1/2008 | DeCinque et al. ........... 725/138 |
| 2008/0092168 | A1 | 4/2008 | Logan et al. |

FOREIGN PATENT DOCUMENTS

JP        2002-002486       1/2002

OTHER PUBLICATIONS

Sprint, *Sprint TekNet IP, Installation Overview*, Jul. 19, 2002, pp. 1-48.

Non-Final Office Action dated Mar. 23, 2007 for U.S. Appl. No. 10/236,286.

Response filed Jul. 23, 2007 to Non-Final Office Action dated Mar. 23, 2007 for U.S. Appl. No. 10/236,286.

Final Office Action dated Oct. 16, 2007 for U.S. Appl. No. 10/236,286.

Response filed Oct. 26, 2007 to Final Office Action dated Oct. 16, 2007 for U.S. Appl. No. 10/236,286.

Advisory Action dated Nov. 19, 2007 for U.S. Appl. No. 10/236,286.

Non-Final Office Action dated Feb. 13, 2008 for U.S. Appl. No. 10/236,286.

Response filed May 13, 2008 to Non-Final Office Action dated Feb. 13, 2008 for U.S. Appl. No. 10/236,286.

Final Office Action dated Sep. 10, 2008 for U.S. Appl. No. 10/236,286.

Non-Final Office Action dated Dec. 11, 2007 for U.S. Appl. No. 10/803,046.

Response filed Mar. 11, 2008 to Non-Final Office Action dated Dec. 11, 2007 for U.S. Appl. No. 10/803,046.

Final Office Action dated Jun. 3, 2008 for U.S. Appl. No. 10/803,046.

Response filed Sep. 3, 2008 to Final Office Action dated Jun. 3, 2008 for U.S. Appl. No. 10/803,046.

Non-Final Office Action dated Nov. 16, 2006 for U.S. Appl. No. 10/928,568.

Response filed Feb. 16, 2007 to Non-Final Office Action dated Nov. 16, 2006 for U.S. Appl. No. 10/928,568.

Final Office Action dated May 21, 2007 for U.S. Appl. No. 10/928,568.

Response filed Jul. 20, 2007 to Final Office Action dated May 21, 2007 for U.S. Appl. No. 10/928,568.

Non-Final Office Action dated Oct. 10, 2007 for U.S. Appl. No. 10/928,568.

Response filed Jan. 8, 2007 to Non-Final Office Action dated Oct. 10, 2007 for U.S. Appl. No. 10/928,568.
Final Office Action dated Apr. 28, 2008 for U.S. Appl. No. 10/928,568.
RCE and Response filed Jun. 30, 2008 to Final Office Action dated Apr. 28, 2008 for U.S. Appl. No. 10/928,568.
Non-Final Office Action dated Aug. 1, 2008 for U.S. Appl. No. 11/074,861.
Response filed Nov. 3, 2008 to Non-Final Office Action dated Aug. 1, 2008 for U.S. Appl. No. 11/074,861.
Non-Final Office Action dated Oct. 18, 2007 for U.S. Appl. No. 11/042,263.
Response filed Jan. 18, 2008 Non-Final Office Action dated Oct. 18, 2007 for U.S. Appl. No. 11/042,263.
Final Office Action dated Apr. 18, 2008 for U.S. Appl. No. 11/042,263.
RCE and Response filed Jul. 18, 2008 Final Office Action dated Apr. 18, 2008 for U.S. Appl. No. 11/042,263.
Non-Final Office Action dated Aug. 21, 2008 for U.S. Appl. No. 11/042,263.
Response filed Nov. 21, 2008 Non-Final Office Action dated Aug. 21, 2008 for U.S. Appl. No. 11/042,263.
Non-Final Office Action date mailed Jan. 21, 2009 for U.S. Appl. No. 10/694,337.
Non-Final Office Action date mailed Dec. 11, 2008 for U.S. Appl. No. 10/803,046.
Non-Final Office Action date mailed Nov. 10, 2008 for U.S. Appl. No. 10/951,740.
Response filed Feb. 10, 2009 to Non-Final Office Action date mailed Nov. 10, 2008 for U.S. Appl. No. 10/951,740.
Advisory Action date mailed Jul. 28, 2008 for U.S. Appl. No. 10/928,568.
RCE/Response filed Oct. 28, 2008 to Final Office Action date mailed Apr. 28, 2008 for U.S. Appl. No. 10/928,568.
Non-Final Office Action date mailed Jan. 9, 2009 for U.S. Appl. No. 10/928,568.
Response filed Mar. 18, 2009 to Non-Final Action dated Jan. 21, 2009 in U.S. Appl. No. 10/694,337.
Final Rejection date mailed Jun. 18, 2009 in U.S. Appl. No. 10/694,337.
Response filed Aug. 13, 2009 to Final Rejection dated Jun. 18, 2009 in U.S. Appl. No. 10/694,337.
Advisory Action date mailed Aug. 31, 2009 in U.S. Appl. No. 10/694,337.
Pre-Appeal Brief Request For Review and Remarks to same; Notice of Appeal all filed on Sep. 18, 2009 in U.S. Appl. No. 10/694,337.
Pre-Appeal Conference Decision date mailed Nov. 18, 2009 in U.S. Appl. No. 10/694,337.
RCE/Amendment filed Dec. 16, 2009 in U.S. Appl. No. 10/694,337.
Non-Final Rejection date mailed Jan. 20, 2010 in U.S. Appl. No. 10/694,337.
Non-Final Office Action dated Dec. 11, 2008 in U.S. Appl. No. 10/803,046.
Response filed Mar. 11, 2009 to Non-Final Action dated Dec. 11, 2008 in U.S. Appl. No. 10/803,046.
Final Rejection date mailed Jul. 14, 2009 in U.S. Appl. No. 10/803,046.
Response filed Sep. 14, 2009 to Final Action dated Jul. 14, 2009 in U.S. Appl. No. 10/803,046.
Advisory Action date mailed Oct. 1, 2009 in U.S. Appl. No. 10/803,046.
RCE/Amendment filed Dec. 14, 2009 in U.S. Appl. No. 10/803,046.
Final Rejection date mailed Jun. 19, 2009 in U.S. Appl. No. 10/951,740.
RCE/Amendment filed Sep. 1, 2009 to Final Rejection dated Jun. 19, 2009 in U.S. Appl. No. 10/951,740.
Non-Final Rejection date mailed Oct. 15, 2009 in U.S. Appl. No. 10/951,740.
Response filed Jan. 15, 2010 to Non-Final Rejection date mailed Oct. 15, 2009 in U.S. Appl. No. 10/951,740.
Response filed Apr. 9, 2009 to Non-Final Action date mailed Jan. 29, 2009 in U.S. Appl. No. 10/928,568.
Final Rejection date mailed Jul. 30, 2009 in U.S. Appl. No. 10/928,568.
Non-Final Rejection date mailed Apr. 2, 2009 in U.S. Appl. No. 11/897,439.
Response filed Apr. 16, 2009 to Non-Final Action date mailed Apr. 2, 2009 in U.S. Appl. No. 11/897,439.
Final Rejection date mailed Jul. 14, 2009 in U.S. Appl. No. 11/897,439.
Response filed Aug. 4, 2009 to Final Rejection dated Jul. 14, 2009 in U.S. Appl. No. 11/897,439.
Advisory Action date mailed Sep. 18, 2009 in U.S. Appl. No. 11/897,439.
RCE/Amendment filed Oct. 5, 2009 in U.S. Appl. No. 11/897,439.
Non-Final Rejection date mailed Dec. 16, 2009 in U.S. Appl. No. 11/897,439.
Final Rejection date mailed Mar. 4, 2009 in U.S. Appl. No. 11/042,263.
Pre-Appeal Request For Review and Remarks to same; Notice of Appeal all filed on Apr. 10, 2009 in U.S. Appl. No. 11/042,263.
Pre-Brief Appeal Conference Decision date mailed Sep. 8, 2009 in U.S. Appl. No. 11/042,263.
Notice of Allowance and Fees Due date mailed Dec. 7, 2009 in U.S. Appl. No. 11/042,263.
Sprint TekNet IP for Higher Education press release, Jul. 2003.
Sprint TekNet IP Overview press release, Jul. 2003.
System Integrates All School Tech Functions press release, Jul. 2003.
IC-Net Systems—FF Coax Network, ICC-Smart TV Controllers, Jul. 2004.
TrueCom Building Communications Systems Communications Controllers 5120 Series, May 1998, Publication S5120-0012-7, pp. 1-6.
Advancements Bring Windows-based Software, Ethernet Network Compatibility to 5120 Intercom Systems, Feb. 2001, pp. 1-2.
Response filed Feb. 26, 2010 to Non-Final Rejection date mailed Jan. 20, 2010 in U.S. Appl. No. 10/694,337.
Examiner Interview Summary date mailed Mar. 5, 2010 in U.S. Appl. No. 10/694,337.
Non-Final Rejection date mailed Feb. 22, 2010 in U.S. Appl. No. 10/803,046.
Reply filed Mar. 3, 2010 to Non-Final Rejection date mailed Dec. 16, 2010 in U.S. Appl. No. 11/897,439.

* cited by examiner

FIG.9 ered cable television network wired to appropriate locations such as classrooms within the facility. By centralizing media players such as video cassette players and DVD players for shared access over the cable television system, equipment expense is reduced. In the case of digital content, downloading and centralizing all the potentially desired content within the facility using electronic storage in local video servers becomes impractical due to the voluminous amounts of content that may be used within a particular facility. Consequently, tracking down digital content, planning corresponding classroom activities, scheduling the use of equipment, and reproducing appropriate content has been a relatively complex operation.

IP-BASED SCHEDULING AND CONTROL OF DIGITAL VIDEO CONTENT DELIVERY

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to distribution of audiovisual content to user locations within a building or facility, and, more specifically, to finding, scheduling, and reproducing digital content from a subscription-based content library stored in a public data network.

Large, multi-room facilities such as schools, business offices, and government buildings often use centralized audiovisual systems in order to provide various multimedia content to multiple locations within the facility. In schools for example, multimedia teaching tools make learning fun and interesting while appealing to varied learning and teaching styles. A centralized video distribution and control system allows optimum usage of video equipment while enabling teachers to integrate multimedia into their classroom activities.

In view of the growth in electronic distribution of multimedia content over public networks such as the Internet, large amounts of digital video material are becoming available for use. However, it is sometimes difficult to find specific content that is desired or to even know whether any exists. Therefore, it would be desirable to collect information about available content in accordance with established subject matter areas that may be of interest or that may be required by applicable educational standards, for example. By centralizing audiovisual equipment for a facility, more effective usage of equipment can be obtained thereby avoiding costs for unnecessary equipment. Many facilities such as schools may have a pre-existing cable television network wired to appropriate locations such as classrooms within the facility. By centralizing media players such as video cassette players and DVD players for shared access over the cable television system, equipment expense is reduced. In the case of digital content, downloading and centralizing all the potentially desired content within the facility using electronic storage in local video servers becomes impractical due to the voluminous amounts of content that may be used within a particular facility. Consequently, tracking down digital content, planning corresponding classroom activities, scheduling the use of equipment, and reproducing appropriate content has been a relatively complex operation.

What is needed is a system architecture that reduces the need for expensive equipment at a user facility and that implements a simple and efficient interface for finding content, planning and scheduling use of content, and controlling reproduction during playback in real time.

SUMMARY OF THE INVENTION

The present invention provides a system architecture and user interface that has advantages of simplicity, efficiency, and low investment and operating costs. A subscription-based content model, such as for educational content, makes finding appropriate content easy. A scheduling interface facilitates the easy integration of the chosen content with other scheduled activities.

In one aspect of the invention, an audiovisual system is provided for a facility having a facility distribution system with a plurality of channels receivable throughout the facility. The facility further includes a local-area network (LAN) adapted to be coupled to a wide-area network (WAN). A plurality of media play devices reproduce media signals from prerecorded media. The media signals are coupled to respective channels of the facility distribution system. A plurality of digital media storage devices store digital content files and each reproduce a respective digital content file as respective analog output signals. Each of the respective analog output signals is coupled to respective channels of the facility distribution system. A main server system is coupled to the LAN and provides a directory of subscribed content items in a content library accessible over the WAN. The main server system maintains respective listings of downloaded content items corresponding to each of the digital media storage devices, wherein the main server system is accessible to a user for initiating reproduction of a selected subscribed content item at a selected time. The main server system initiates transfer of the selected subscribed content item from the content library if not listed in a respective listing of downloaded content items for one of the digital media storage devices which is available at the selected time. The main server system includes a media device scheduling component for designating scheduled times for utilizing a selected media play device to send the reproduced media signal to a selected channel in the facility distribution system. A media controller device is coupled to the LAN, the media play devices, and the digital media storage devices for controlling playing of a selected one of the devices in response to commands from the user receiving the selected subscribed content item via a corresponding channel of the facility distribution system.

DETAILED DESCRIPTION OF PREFERRED EMBODIMENTS

Figure 1:
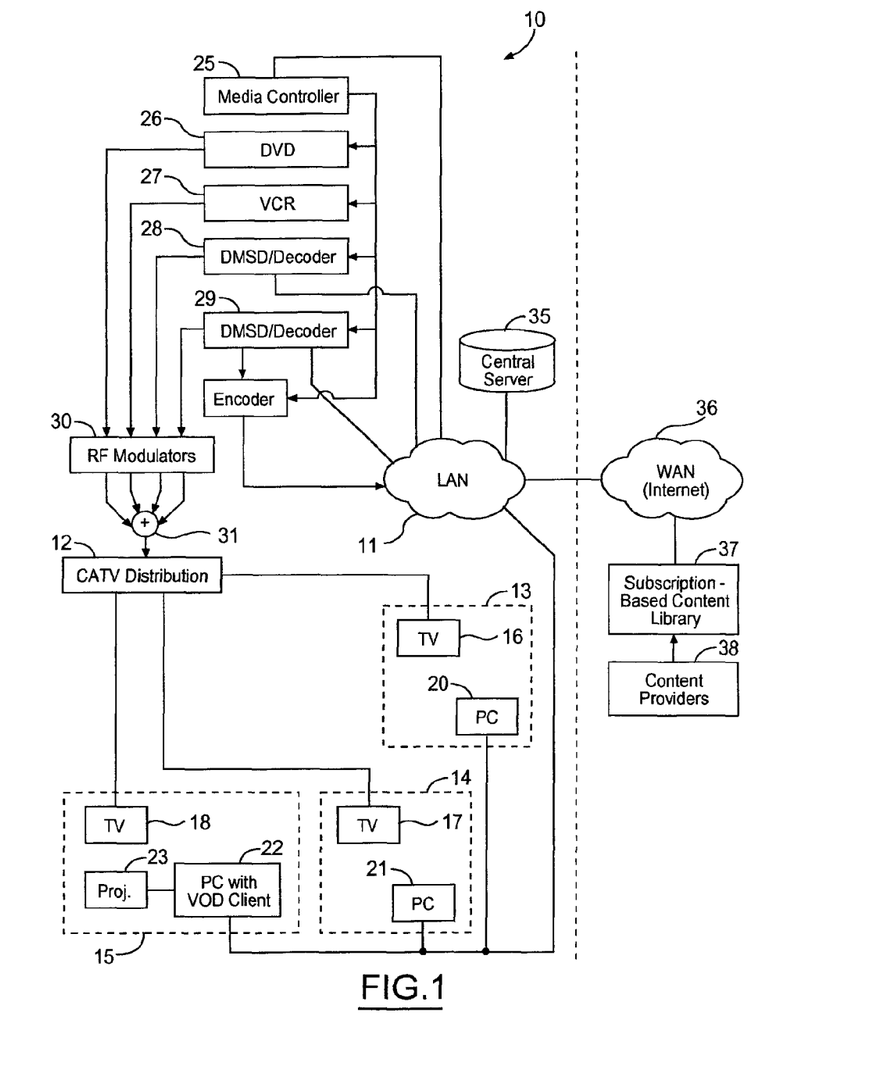
FIG. 1 is a block diagram showing a preferred embodiment of the audiovisual of the present invention.

Referring to the preferred embodiment of FIG. 1, a facility 10 has a local area network (LAN) 11 and a community antenna (i.e., cable) TV (CATV) distribution system 12 wired throughout. Facility 10 includes specific user locations 13, 14, and 15, such as classrooms in a school. CATV distribution system 12 is connected to televisions 16-18 in rooms 13-15, respectively. LAN 11 is likewise wired to rooms 13-15 and may be connected there to respective personal computers 20, 21, and 22. PCs 20-22 may be used primarily for implementing a user interface for controlling operation of the audiovisual system, but may also be used for viewing digital content items or for projecting images using a projector 23, for example.

The remaining components of the audiovisual system may preferably be contained in a central location within facility 10, such as an AV room in a school. A media controller 25 is coupled to LAN 11 and to various media play devices including a DVD player 26 and a VCR 27 and to a plurality of digital media storage devices (DMSD)/decoders 28 and 29. Each DMSD 27-29 can store many digital content files and can reproduce a respective digital content file as respective analog output signals. The media play devices such as DVD player 26 and VCR 27 reproduce media signals from prerecorded media such as DVD discs or videotapes. The media signals from media play devices 26 and 27 and the analog output signals from DMSD/decoders 28 and 29 are coupled to RF modulators 30, which generate cable television signals on respective TV channels. The plurality of channels from all the RF modulators are added together in a summer 31 and the summed output is coupled to CATV distribution system 12 for distribution throughout the facility.

By providing the multimedia content to individual locations such as classrooms via the CATV distribution system 12, excessive traffic on LAN 11 is avoided. Nevertheless, it is desirable to also support streaming of multimedia content over LAN 11 to individual locations for reproduction using a personal computer. Thus, an encoder 32 is shown receiving an analog output from DMSD 29. The analog output from DMSD 29 is digitally encoded for streaming across the LAN network to a PC 22 that includes a video on-demand (VOD) client for viewing the stream. Downloaded or streamed content of the present invention may comprise files in mpeg format, Microsoft Windows Media 9, or other formats. The streamed content can be viewed on a display associated with PC 22 or can be projected onto a screen using projector 23. Although only one encoder is shown in FIG. 1, a plurality of encoders may preferably be used and may be connected with any of the media play devices or digital media storage devices as desired. Certain media play devices or DMSDs may be connected to correspondingly dedicated encoders, or an encoder may be shared by switching its inputs among the outputs of a plurality of media devices.

The overall functionality and control of the audiovisual system of the invention is provided by a main server system contained in a central server machine 35, for example. The main server system includes a browser interface and other software components as described below.

LAN 11 is coupled to a wide area network (WAN) 36 such as the Internet. WAN 36 is used for accessing remote resources including a subscription-based content library 37 which includes various content items provided by content providers 38. In a preferred embodiment of the present invention, users at the user locations in facility 10 can conveniently access a large library of content items stored in content library 37. By using digital media storage devices 28 and 29 which are optimized to store an intermediate volume of content and to seamlessly interact with content library 37, expensive and complicated equipment are avoided at facility 10.

Figure 2:
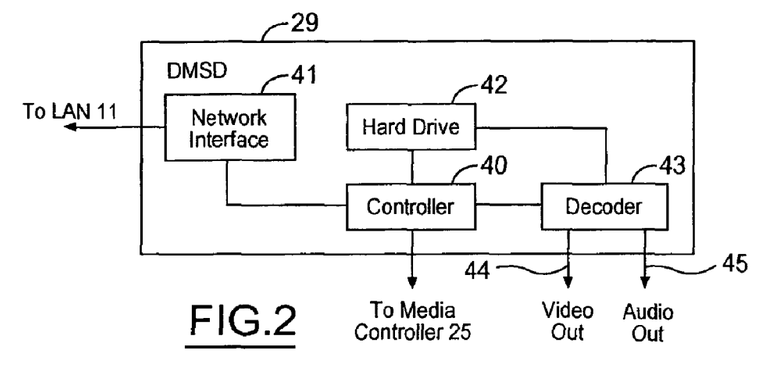
FIG. 2 is a block diagram of a digital media storage device used in the preferred embodiment.

One embodiment of a digital media storage device is shown in greater detail in FIG. 2. DMSD 29 includes a controller 40 coupled to media controller 25 by an infrared or other optical coupling, for example. Controller 40 is coupled to LAN 11 by a network interface 41. Digital content downloaded or streamed via network interface 41 is stored on a hard drive 42. Controller 40 is coupled to hard drive 42 and to a decoder 43 which converts content items stored on hard drive 42 into analog video outputs 44 and 45. DMSD 29 may be of the type used in the Akimbo video on-demand system commercially available from Akimbo Systems, Inc., of San Mateo, Calif. The Internet accessible content library used in the Akimbo system could also be used to provide the subscription-based content library of FIG. 1, for example.

Media controller 25 is a hardware device for interfacing with and controlling the media play devices, the digital media storage devices, and any encoders present within the audio visual system. Media controller 25 preferably controls the devices using an infrared or other optical link as described in co-pending U.S. application Ser. No. 10/694,337, filed Oct. 27, 2003, co-pending U.S. application Ser. No. 10/803,046, filed Mar. 17, 2004, and co-pending U.S. application Ser. No. 10/951,740, filed Sep. 28, 2004, all incorporated herein by reference.

Figure 3:
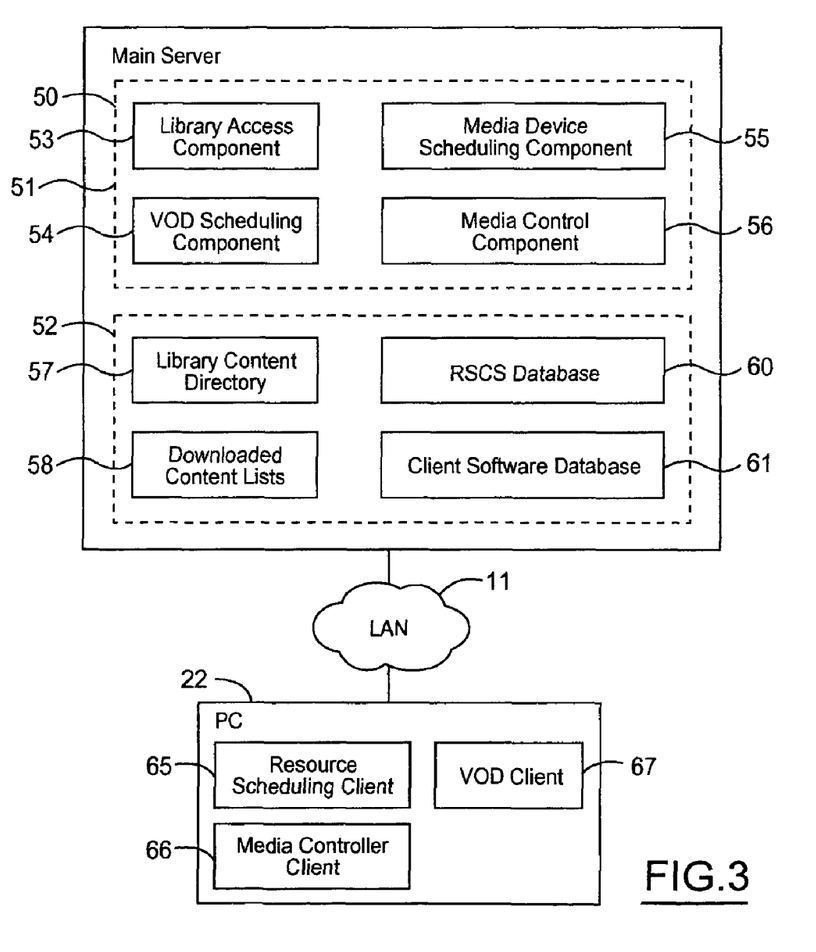
FIG. 3 is a block diagram showing a main server system and a personal computer of the present invention in greater detail.

As shown in FIG. 3, a main server system 50 includes software components 51 and data components 52. The main server system is a multi-tier server/client real-time system. Software components 51 include a library access component 53, a VOD scheduling component 54, a media device scheduling component 55, and a media control component 56. Data component 52 include a library content directory 57, downloaded content lists 58, a resource scheduling and media control software (RSCS) database 60, and a client software database 61.

VOD scheduling component 54 provides a browsable interface to a user for selecting desired content items that are shown within library content directory 57.

VOD scheduling component 54 determines availability of previously downloaded content by consulting downloaded content lists 58 which correspond to respective digital media storage devices. It consults RSCS database 60 to determine availability of a respective DMSD unit at the desired time for viewing a selected content item. If a desired content item is not previously downloaded on an available DMSD device, then VOD scheduling component 54 activates library access component 53 for retrieving a selected content item from the remote subscription-based content library.

Media device scheduling component 55 interfaces with a user for purposes of scheduling media play devices such as a VCR or a DVD player and consults RCSC database 60 to determine availability of devices as described in the above-mentioned co-pending applications.

Media control component 56 provides real-time control of all the media play devices and digital media storage devices during reproduction of any particular content item scheduled by a user.

Client software database 61 stores all the client-side software needed by users. It is a source for installing needed software on personal computers at the user locations within the facility. Thus, a PC 22 is coupled via LAN 11 to main server system 50 and downloads a resource scheduling client 65, a media controller client 66, and a VOD client 67.

Figure 4:
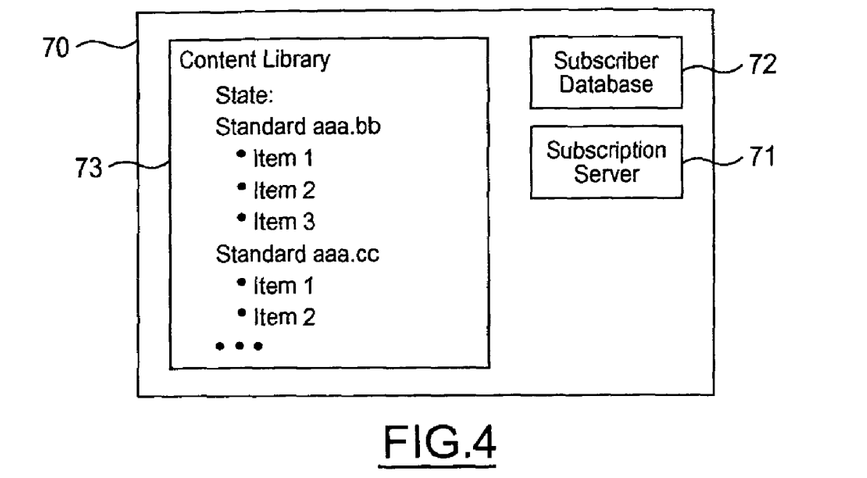
FIG. 4 is a block diagram showing a remote content library.

A remote content library service 70 is shown in FIG. 4. A subscription server 21 is connected to a subscriber database 72 and a content library database 73. To download content items, a remote user contacts subscription server 71 to provide subscription information and to identify desired content. Subscription server 71 uses subscriber database 72 to authenticate a requester and determine which content items are included in the remote requester's subscription. Content library 73 for educational purposes may be organized as shown according to respective educational standard syllabi. As shown, these may be organized by state or by other organization issuing standards. By organizing content items according to standardized educational content, educators can more easily identify appropriate content items corresponding to particular classroom activities. For example, a particular standard 7.12 may relate to a particular syllabi such as Newton's Laws of Motion. Various content items demonstrating aspects of Newton's Law of Motion, particularly information required by the corresponding standard, are shown below that standard. The individual content items may comprise video clips, animations, audio recordings, or any other desired multimedia presentations. Subscriber database 72 preferably includes the data necessary to assemble the library content directory to be used by a respective subscriber. The data may preferably include titles and summary descriptions for each subscribed item.

Figure 5:
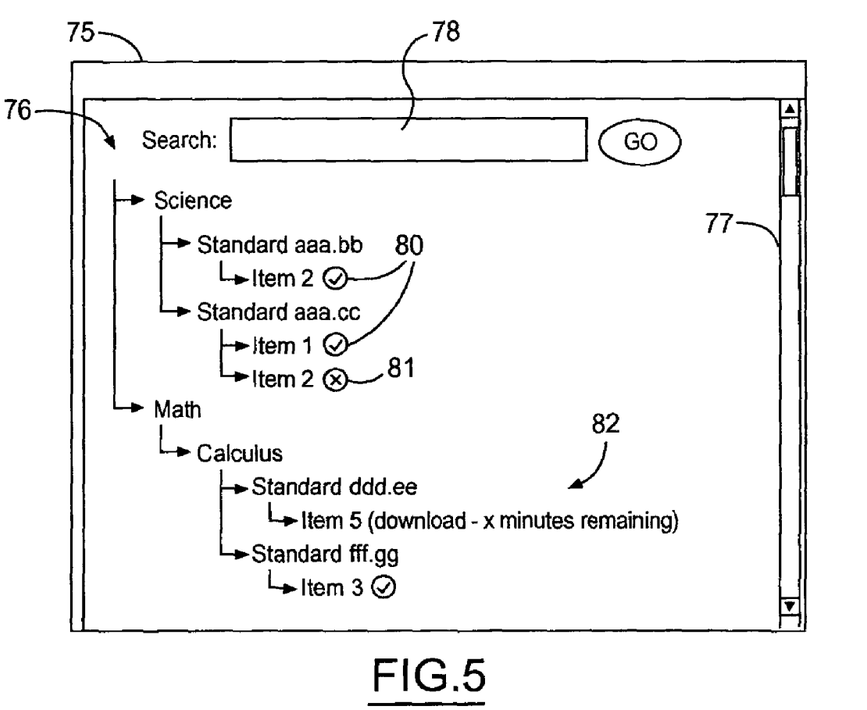
FIG. 5 is a screen shot of a user interface for selecting items of subscribed content for reproduction.

FIG. 5 shows a user interface for browsing subscribed content items contained in the library content directory within a facility. A screen shot 75 includes a content item tree 76, which is preferably organized by subject matter topics and by corresponding standards. A user may scroll through the entire directory using scroll bars 77 or may locate specific items using a search window 78. Descriptive terminology for the standards and the items shown in FIG. 5 would typically be utilized and would provide the basis for searching the list.

In the example of FIG. 5, each item within the subscription of the facility is shown in tree 76. Example, under a standard aaa.bb, an item #2 is contained in the subscription while within a standard aaa.cc, items #1 and #2 are included in the facility's subscription. Icons 80 are used to indicate that a particular content item is already downloaded and available for viewing and an icon 81 indicates that a corresponding item resides only in the remote content library and would be to be downloaded prior to viewing. During downloading, an indication 82 is shown in connection with a corresponding content item to provide the remaining time before completion of the download. Each item is preferably shown as a hyperlink and selecting an item by placing a mouse cursor over the item and clicking makes a selection of an item for viewing.

Figure 6:
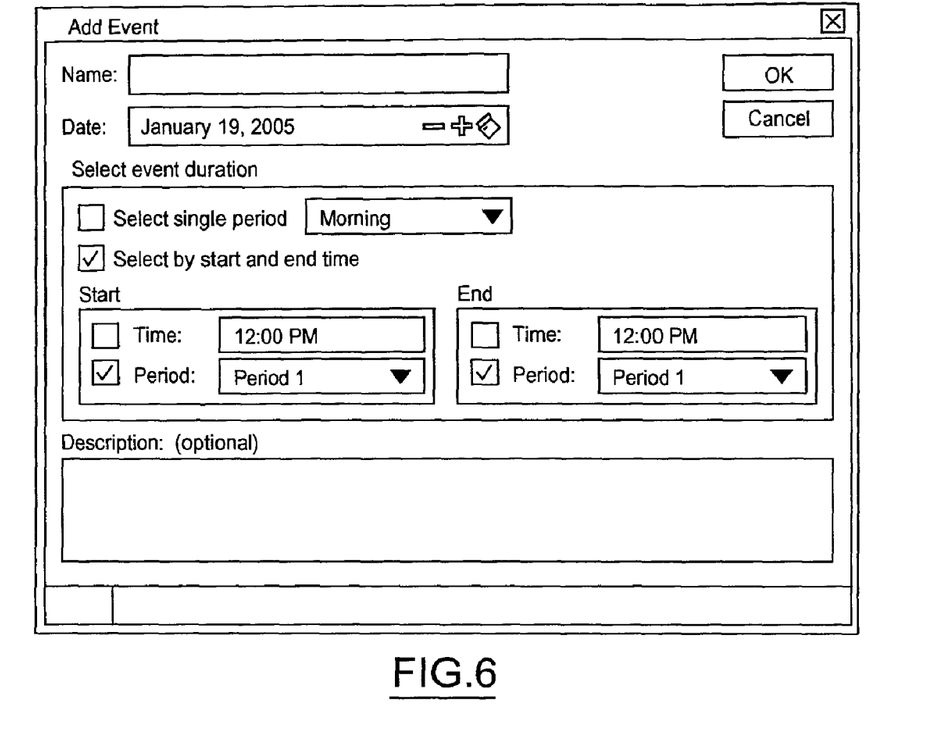
FIG. 6 is a screen shot showing a portion of the user interface for scheduling an event for reproducing a selected content item.

After an item is selected, the user is presented with an "add event" screen as shown in FIG. 6. After entering a date and a start time or a class period, availability of system hardware components and availability of the particular content can be determined.

Figure 7:
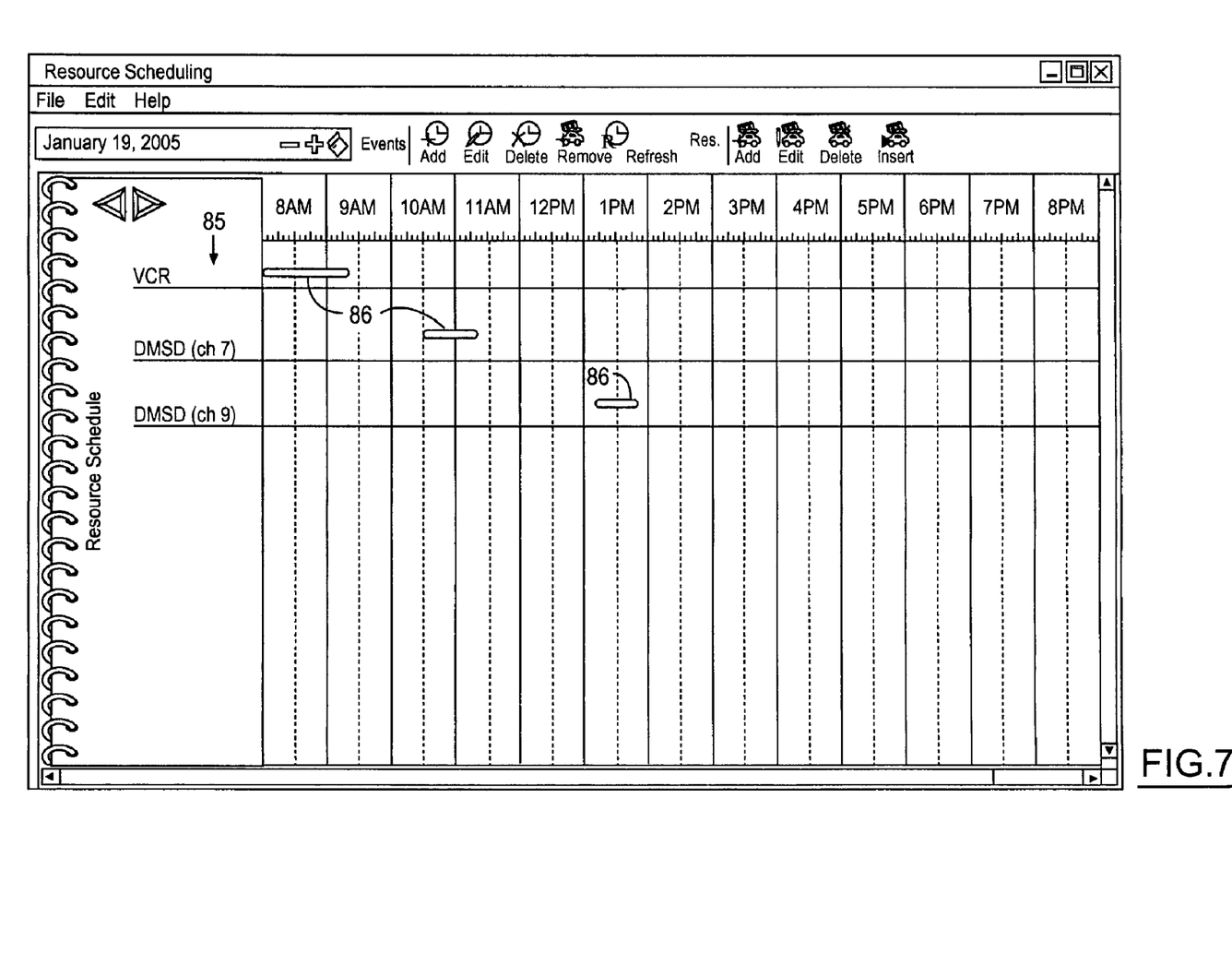
FIG. 7 is a screen shot showing a resource schedule.

In response to accessing the RSCS database, a resource schedule as shown in FIG. 7 can be viewed for a particular user or for all users, as desired. Individual media play devices or digital media storage devices are identified in a column 85.

Shaded bars 86 designate times during which particular hardware devices are scheduled for use.

Figure 8:
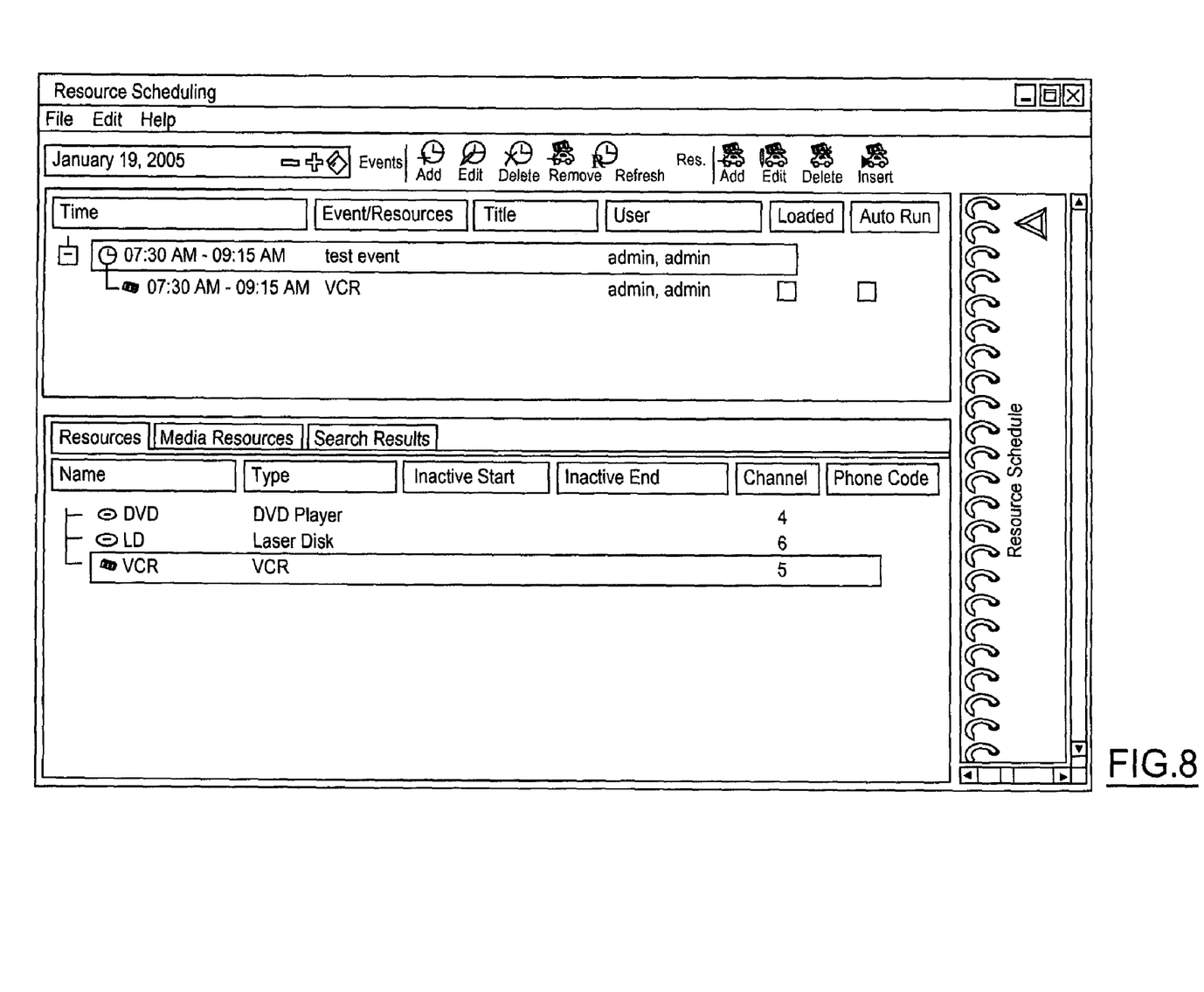
FIG. 8 is a screen shot showing a portion of the user interface for scheduling use of a media player.

FIG. 8 shows an alternative view of resource scheduling for determining availability of devices and for adding, editing, or deleting events.

Figure 9:
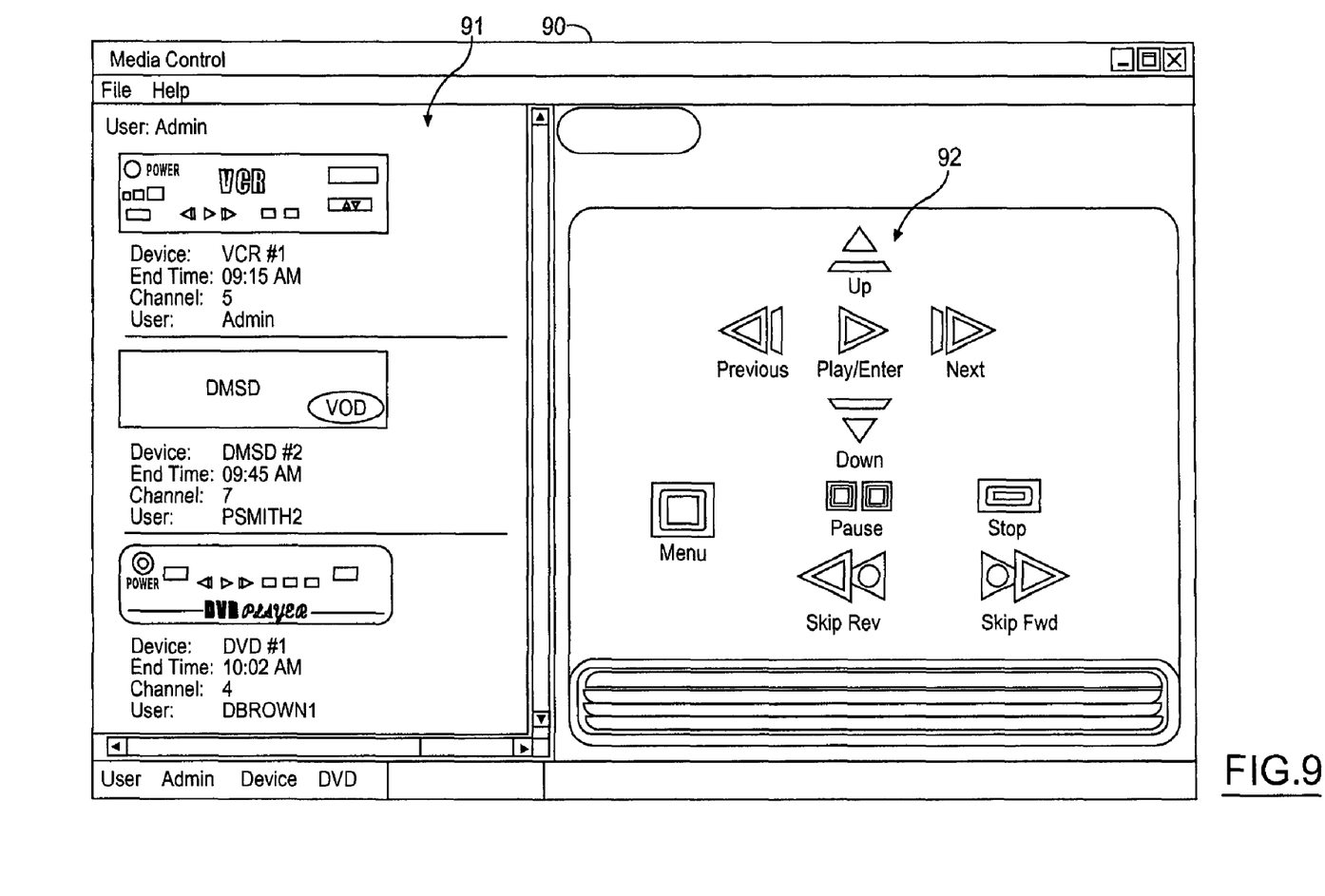
FIG. 9 is a screen shot showing a portion of the user interface for controlling playback of a selected content item in real time.

FIG. 9 shows a user interface for controlling playback of selected content items during reproduction in real-time. Screen 90 includes a left-hand window 91 for selecting available devices and a right hand window 92 for containing the actual media controls. In the example of FIG. 9, an administrative user is shown accessing the interface so that all active devices are shown in window 91. Access for other individual users (i.e., without administrative rights) would show only those devices currently reproducing audiovisual content according to an event the user created.

An icon 93 represents a particular DMSD reproducing a video program for user PSMITH2. By highlighting icon 93, the media transport controls in window 92 can actively control playback from DMSD #2 being viewed by PSMITH2. Thus, window 92 includes various buttons corresponding to the usual playback commands for the corresponding device.

Figures 10, 11:
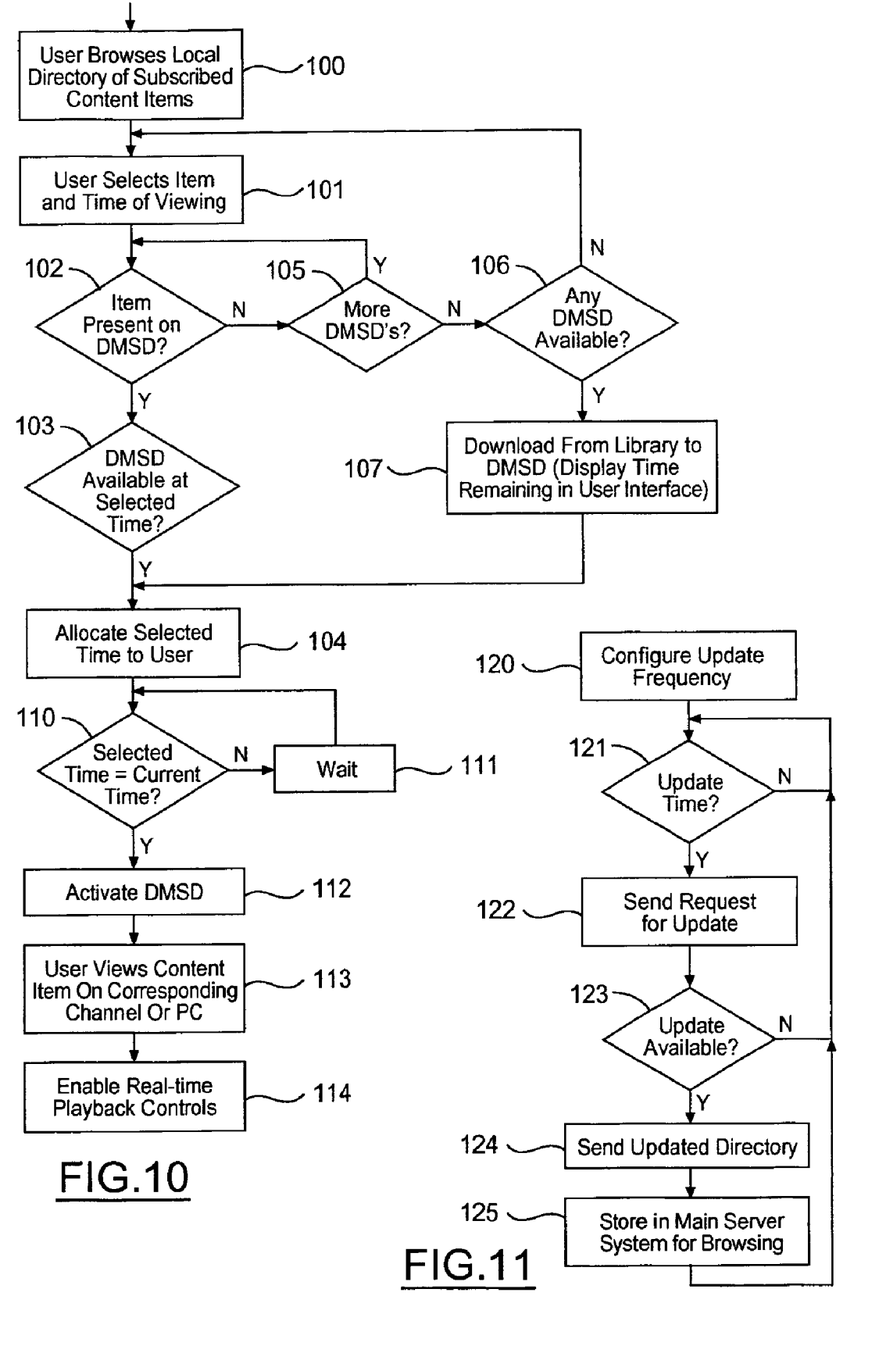
FIG. 10 is a flowchart showing a preferred method for selecting and reproducing digital content items from a subscription-based content library.
FIG. 11 is a flowchart of a preferred method for locally maintaining an up-to-date directory of subscribed content items.

A preferred method for providing access to selected content items available from the content library directory is shown in FIG. 10. In step 100, a user browses the locally stored directory of subscribed content items to determine a desired content item for reproduction. In step 101, the user selects an item and the time for viewing the item. A check is made in step 102 to determine whether the selected item is present on a first one of the DMSDs. If the item is found on the first DMSD, then a check is made in step 103 to determine whether that DMSD is available at the selected time (i.e., the DMSD may already be scheduled for reproducing a different content item at the selected time by another user). If the DMSD is available at the selected time, then the selected unit and selected time are allocated to the user in step 104 by updating the RSCS database.

If the item is not present on the DMSD or the DMSD is not available at the selected time, then a check is made in step 105 to determine whether there are more DMSD devices to be checked. If there are, then steps 102 and 103 are repeated for the additional devices. If there are no more devices to be checked, then a check is made in step 106 to determine whether any DMSD is available at the selected time. If not, then the user is returned to step 101 for possibly selecting a different time for viewing. If step 106 determines that a DMSD is available, then the selected content item is downloaded from the remote subscription-based content library to the available DMSD in step 107. During download, the time remaining for completing the download is displayed in the user interface. Once the download is complete, the corresponding DMSD and selected time are allocated to the user in step 104.

In step 110, the selected time is compared with the current time to determine whether they are equal. If they are not (i.e., the selected time is yet in the future), then the main server system waits in step 111 for a short delay and then rechecks the time in step 110. When the selected time equals the current time, then the DMSD corresponding to a particular event is activated in step 112 for reproducing the selected content item. In step 113, the use views the content item on the corresponding channel of the CATV distribution system or on a corresponding PC as determined in the set-up of the event. Real-time playback controls are enabled for the user and the corresponding DMSD in step 114.

From time to time, content items may be added to the subscription for a particular facility (e.g., when a content provider adds new multimedia presentations corresponding to a particular educational standard syllabi). When items are added to the content library, updates must be made to the library content directory locally stored at the facility. FIG. 11 is a flowchart of one embodiment of a method for updating the directory. Updates must either be pulled from the content library to the main server system at a facility or be pushed from the library to the local server. If pushed, then updates can be sent whenever they become available. If pulled, then periodic checks are made for an update. Thus, in step 120, an update frequency is configured within the main server system (e.g., a daily check made outside of normal working hours). In step 121, a check is made to determine whether an update time has arrived. If not, then a return is made to check at a later time. If the update time is reached, then the main server sends a request over the Internet to the content library for an update. The content library service checks whether an update is available in step 123. If not, then a message may be sent that there is no update and a return is made to step 121 to wait for the next update time. If an update is found, then an updated directory is compiled and sent to the main server system in step 124. In step 125, the updated directory is stored in the main server system for browsing by users.

What is claimed is:

1. An audiovisual system for a school facility having a facility distribution system with a plurality of channels receivable throughout said facility, wherein said school facility further includes a local-area network (LAN) adapted to be coupled to a wide-area network (WAN), said audiovisual system comprising:
a plurality of media play devices for reproducing media signals from prerecorded media including at least subscribed content items in separate classrooms within said school facility, said plurality of media play devices being coupled to respective channels of said facility distribution system;
a plurality of digital media storage devices for storing digital content files including the subscribed content items and for each reproducing a respective digital content file as respective analog output signals, each of said respective analog output signals being coupled to respective channels of said facility distribution system;
a main server system coupled to said LAN, wherein said main server system provides a directory of the subscribed content items in a content library accessible over said WAN, wherein the directory includes a content tree, the content tree is hierarchically assembled to interactively link data and information from an educational standard syllabi to data and information of subject matter topics and the data and information of the subject matter topics to data and information of education standards, respectively, wherein the content tree is interactive for allowing the user to navigate the content tree and select any of the subscribed content items associated with each of the education standards, wherein said main server system maintains respective listings of downloaded content items corresponding to each of said digital media storage devices, wherein said main server system is accessible to a user for initiating reproduction of a selected subscribed content item at a selected time, wherein said main server system initiates transfer of said selected subscribed content item from said content library if not listed in a respective listing of downloaded content items for one of said digital media storage devices which is available at said selected time, and wherein said main server system includes a media device scheduling component for designating scheduled times for utilizing a selected media play device to send said reproduced media signal to a selected channel in said facility distribution system; and
a media controller device coupled to said LAN, said media play devices, and said digital media storage devices for controlling playing of a selected one of said devices in response to commands from said user receiving said selected subscribed content item via a corresponding channel of said facility distribution system.

2. The audiovisual system of claim 1 wherein said main server system sends said directory to said user via said LAN together with a status of each of the subscribed content items, and wherein the subscribed content items are associated with each of a plurality of classroom activities.

3. The audiovisual system of claim 2 wherein said status comprises an indication of the subscribed content items being stored in one of said digital media storage devices.

4. The audiovisual system of claim 3 wherein said indication comprises a time remaining to complete a transfer of an item in the process of being transferred from said content library to one of said digital media storage devices.

5. The audiovisual system of claim 1 further comprising:
a subscriber database in communication with the main server, the subscriber database operable to assemble the directory for each of a plurality of subscribers utilizing data included in the educational standard syllabi, the subject matter topics, and the education standards, wherein the data includes a title and summary for each of the subscribed content items; and
a VOD client at a user location within said school facility for receiving a network stream via said LAN, said network stream corresponding to said selected digital content file on a respective digital media storage device.

6. The audiovisual system of claim 5 further comprising:
a digital encoder coupled to a respective analog output of said respective digital media storage device for generating said network stream.

7. The audiovisual system of claim 5 further comprising:
a personal computer coupled to said LAN for including said VOD client and producing video and audio in response to said network stream.

8. The audiovisual system of claim 7 further comprising:
an audiovisual projector coupled to said personal computer to project said video at said user location.

9. The audiovisual system of claim 1 wherein said content library is subscription based and wherein said main server system identifies a subscription for said school facility when initiating transfer of said selected subscribed content item.

10. The audiovisual system of claim 9 wherein said subscribed content items include a plurality of content items corresponding to respective educational standard syllabi, wherein the educational standard syllabi are set by a state, and wherein the subscribed content items are video clips, animations, audio recordings, and media presentations approved for classroom activities.

11. The audiovisual system of claim 1 wherein said media signals reproduced by said plurality of media play devices are comprised of analog media signals and wherein said audiovisual system further comprises a plurality, of RF modulators for RF modulating said analog media signals and said analog output signals onto said plurality of channels of said facility distribution system.

12. The audiovisual system of claim 10 wherein the content tree is linked in an expandable form to a database storing the directory.

13. The audiovisual system of claim 1 wherein the plurality of media devices, the plurality of digital media storage devices, the main server, and the media controller device are located within the school facility, wherein said WAN is comprised of the Internet, wherein the media device scheduling component is: a resource scheduling media control software database (RSCS), the RSCS database being operable to display a schedule listing availability of the plurality of media devices and the plurality of digital media storage devices and reserving, editing or deleting usage of the plurality of media devices and the plurality of digital media storage devices.

14. A method of distributing audiovisual content within an education facility having a facility distribution system with a plurality of channels receivable throughout said facility, wherein said facility further includes a local-area network (LAN) adapted to be coupled to a wide-area network (WAN), said method comprising the steps of:
- a user accessing a locally-stored directory of subscribed content items, wherein the directory includes a content tree, the content tree is hierarchically assembled in an expandable form to interactively link data and information from an educational standard syllabi to data and information of subject matter topics and the data and information of the subject matter topics to data and information of education standards, respectively, wherein the content tree is interactive for allowing the user to navigate the content tree and select any of the subscribed content items corresponding, wherein all of said subscribed content items are stored in a content library accessible over said WAN, and wherein some of said subscribed content items are stored in a respective one of a plurality of digital media storage devices in said facility distribution system from previous transfer from said content library;
- said user selecting a subscribed content item for reproduction during a selected class period via one of a plurality of digital media storage devices in said facility distribution system;
- checking whether said selected content item is presently stored in a one of said digital media storage devices which is available at said selected class period;
- if not presently stored in an available digital media storage device then transferring said selected content item to an identified digital media storage device available at said selected class period;
- at said selected class period reproducing said selected content item onto a respective channel of said facility distribution system and viewing at a desired location within said facility.

15. The method of claim 14 further comprising the step of:
during said transfer, displaying to said user a remaining time to complete said transfer.

16. The method of claim 14 further comprising the step of controlling playing of said selected content item in real-time from a classroom corresponding to the location of the user in response to commands from said user coupled to said digital media storage device by a media controller device within said LAN.

17. The method of claim 14 wherein said education facility is an educational campus and wherein said subscribed content items include a plurality of content items corresponding to respective standard educational syllabi, wherein the content tree is linked in an expandable form to a database storing the directory.

18. The method of claim 14 further comprising the steps of:
updating said content library and said directory with new content items in response to addition of the new content in the content library by a content provider; and
transferring an updated version of the directory from said content library for local storage, wherein the subscribed content items are associated with each of a plurality of classroom activities.

19. The method of claim 14 wherein said selected class period is a future time, said method further comprising the step of:
comparing a current time with said selected class period and initiating said reproduction of said selected content item when said current time matches a time associated with said selected class period.

20. A method of distributing media content within an education facility having
a facility distribution system with a plurality of channels receivable throughout the facility, wherein the facility further includes a local-area network (LAN) adapted to be coupled to a wide-area network (WAN), said method comprising the steps of:
a user accessing a locally-stored directory of subscribed content items in a class room of the education facility, the subscribed content items being associated with each of a plurality of classroom activities, the directory being assembled for the user, wherein the directory includes a content tree displayable to the user, the content tree being hierarchically assembled in a browsable interface linking an educational syllabi, to subject matter topics, to the education standards respectively, the content tree being so assembled and displayable to enable the user to: navigate the directory and identify and select the subscribed content items corresponding to classroom activities, the educational syllabi are linked to expanded data and information associated with the subject matter topics, wherein the subject matter topics are linked to expanded data and information associated with the education standards, wherein the education standards are linked to expand the subscribed content items associated with each of the education standards, wherein the hierarchical organization of the content tree corresponds to a classroom of the education facility, the content tree including a plurality of hyperlinks corresponding to each of the subscribed content items, wherein all of said subscribed content items are stored in a content library accessible over said WAN a status of availability of each of the subscribed content times available in the content tree being displayed to the user, wherein the directory communicates with one or more databases to assemble the directory utilizing a title and summary for each of the subscribed content times, and wherein some of said subscribed content items are stored in a respective one of a plurality of digital media storage devices in said facility distribution system from previous transfer from said content library;
said user selecting a subscribed content item for reproduction during a selected class period via one of a plurality of digital media storage devices in said facility distribution system;
updating the directory with new content corresponding to the educational syllabi in response to addition of the new content in the content library by a content provider;
determining whether said selected content item is presently stored in a one of said digital media storage devices which is available at said selected class period;
displaying availability of the plurality of media devices and the plurality of digital media storage devices for reserving, editing or deleting scheduled usage of the plurality of media devices and the plurality of digital media storage devices;
transferring said selected content item to an identified digital media storage device available during said selected class period in response to determining said selected content item is not presently stored in an available digital media storage device then, an indicator of the download status being displayed to the user during the transferring;
at said selected class period reproducing said selected content item onto a respective channel of said facility distribution system and viewing at a desired location within said facility; and
receiving user input for controlling playback of said selected content item from the classroom during said selected class period.

* * * * *